United States Patent [19]

Lech, Jr. et al.

[11] 3,893,556

[45] July 8, 1975

[54] FLUID RELEASED CLUTCH

[75] Inventors: Ted Lech, Jr., Roseville, Mich.;
Christian M. Waldhelm, San Diego, Calif.

[73] Assignee: Dana Corporation, Toledo, Ohio

[22] Filed: May 2, 1974

[21] Appl. No.: 466,094

[52] U.S. Cl. ............................. 192/91 A; 188/176
[51] Int. Cl.² ........................................ F16D 25/00
[58] Field of Search .................. 192/91 A; 188/170

[56] References Cited
UNITED STATES PATENTS

| | | | |
|---|---|---|---|
| 2,698,676 | 1/1955 | Eason | 192/91 A X |
| 2,901,066 | 8/1959 | Garmager | 192/91 A X |
| 2,920,732 | 1/1960 | Richards et al. | 192/87.17 |
| 3,044,595 | 7/1962 | Herr | 192/87.17 |
| 3,145,816 | 8/1964 | Lorean et al. | 192/91 A |
| 3,771,627 | 11/1973 | Caldwell et al. | 188/170 |
| 3,773,152 | 11/1973 | Sitton | 188/170 |
| 3,804,219 | 4/1974 | Cummings | 192/91 A X |

*Primary Examiner*—Benjamin W. Wyche
*Attorney, Agent, or Firm*—Robert E. Pollock

[57] ABSTRACT

A normally engaged torque transmitting device is disclosed. In a typical application, the device is used as a brake to resist rotation of a shaft. The device consists of two members normally frictionally clamped together by one or more sets of interleaved friction discs and separator plates such as those commonly associated with shaft connecting clutches. The first member is a cylindrical housing with means for attachment to a shaft, stationary frame member, or the like. The housing includes a bore in which is received at least one friction disc splined thereto to permit axial but not rotational movement with respect thereto. The second member is a collar for fixed connection to a shaft or the like and includes outwardly extending separator plates interleaved with the friction discs on the housing. The friction discs splined to the housing and separator plates splined to the collar are urged into engagement by a pressure plate and spring means. A tubular member is carried within and engages the pressure plate. Two spaced annular plates are carried between the housing and tubular member. Introduction of fluid in the space between the annular plates separate the plates and, via the tubular member, moves the pressure plate away from the friction discs and separator plates.

1 Claim, 2 Drawing Figures

3,893,556

3,893,556

FLUID RELEASED CLUTCH

BACKGROUND OF THE INVENTION

This invention relates to torque transmitting devices and more particularly to such devices which normally serve to clutch two members together and release the members for free relative rotation upon fluid pressure actuation. An exemplary application for such a device is as a fail safe fluid pressure released brake.

SUMMARY OF THE INVENTION

The normally engaged torque transmitting device of the present invention includes a housing, adapted for connection to an output, having an axial bore and an axial spline therein. One or more friction discs are carried within the housing and engage the spline. An input member, adapted for connection to an output, includes an axial spline and carries one or more separator plates. The separator plates on the input and friction discs on the output members are urged into engagement by a pressure plate and spring means reacting upon the hub. A means is also carried by the housing to allow selective urging of the pressure plate away from the friction discs and separator plates.

Preferably the pressure plate, spring means and means for allowing selective disengagement of the input and output are all annular in nature, providing a strong, simple, readily assembled device.

BRIEF DESCRIPTION OF THE DRAWINGS

While the specification concludes with claims which particularly point out and distinctly claim what is considered to be the present invention, it is believed that the same will be better understood with reference to the following description taken in conjunction with the drawings in which:

DESCRIPTION OF THE PREFERRED EMBODIMENTS

Figure 1:
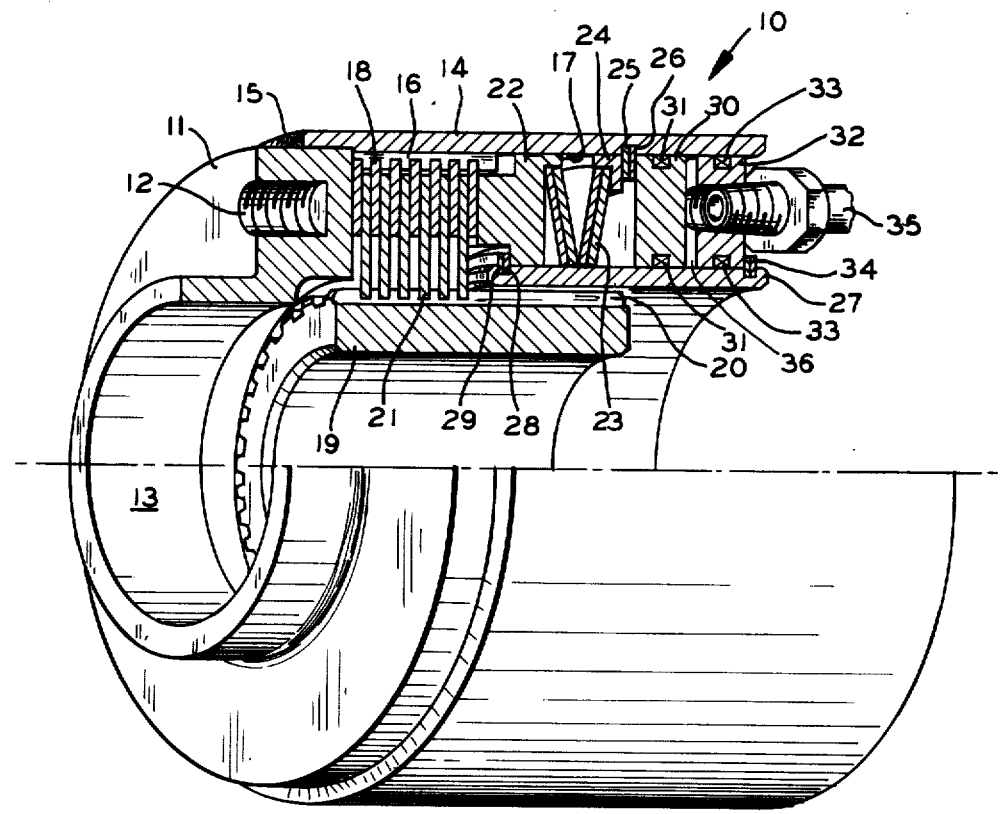
FIG. 1 is an isometric vertical elevational view, partially cut away, of a preferred embodiment of the present invention.

The normally engaged torque transmitting device of the present invention is shown in FIG. 1 and referred to generally by the numeral 10. In a common application the device 10 will be used as a normally engaged brake and it will be so referred to hereinafter. It will be recognized, of course, that the device 10 will also be useful in applications in which it would function as a clutch.

The brake 10 includes an output member 11 adapted for connection to an output via bolts (not shown), in tapped holes 12, via an input shaft mounted in the bore 13 or other suitable means. The output 11 is a housing and includes a sleeve 14 integral therewith or, preferably, as a separate member secured thereto by welds 15 or the like. One or more axial splines 16 are within the bore 17 of the sleeve 14. At least one and preferably a plurality of friction discs 18 are slidably carried within the bore and axially piloted on the splines 16.

An input member is adapted for connection to an input and typically comprises a collar 19 adapted to engage a shaft. One or more axial splines 20 are on the exterior of the collar 19. Separator plates 21 are carried on the collar 19 and axially piloted thereon by the splines 20. The friction discs 18 on the output member and separator plates 21 on the input member are interleaved in the conventional manner.

An annular pressure plate 22 is carried within the bore 17 and is located adjacent the friction discs 18 and separator plates 21. A spring means is carried within the bore 17 and biases the pressure plate 22 toward the friction discs 18 and separator plates 21. Preferably, the spring means comprises one or more annular beveled washers 23 reacting against the sleeve 14 via "L" shaped washer 24 and rings 25 which seat in the groove 26 in the sleeve 14.

Figure 2:
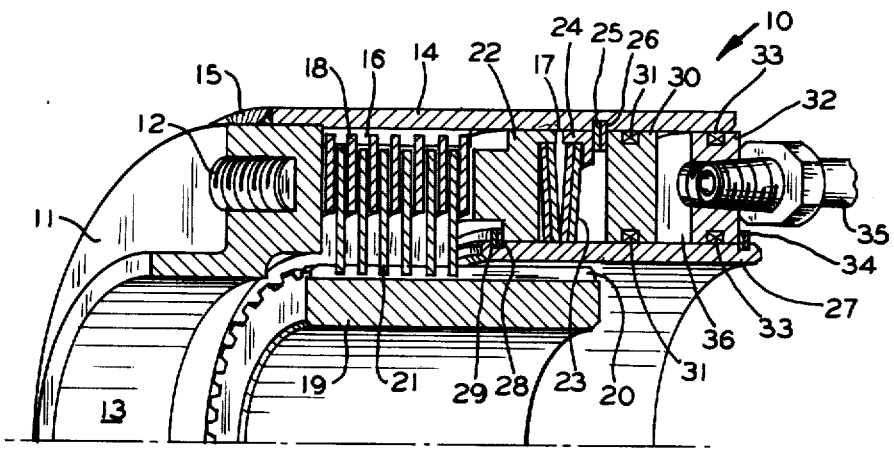
FIG. 2 is an isometric partial view of the device of FIG. 1 in the disengaged or released position.

A release means is carried within the bore 17 for selectively moving the pressure plate 22 away from the friction discs 18, and separator plates 21. Preferably the release means is adapted for actuation by fluid pressure and, as shown in FIGS. 1 and 2, comprises an axially shiftable tubular member 27 which engages the pressure plate 22 via snap rings 28 which are carried in groove 29. Slidably and sealingly mounted within the bore 17 and surrounding the tubular member 27 is an annular reaction plate 30. Preferably the reaction plate 30 includes circumferential grooves within which are carried "O" rings 31. An annular back plate 32 is also slidably and sealingly mounted within the bore 17 and surrounding the tubular member 17. Plate 32 preferably includes circumferential grooves within which are carried "O" rings 33 and engages tubular member 27 via snap rings 34. A connection 35 provides for communications between the chamber 36, defined by the bore 14, tubular member 27 and annular plates 30 and 32, and a source of fluid pressure.

Normally, and as shown in FIG. 1 the friction discs 18 and separator plates 21 are clamped together by the springs 23 reacting against the pressure plate 22, thereby locking the input to the output. Upon application of fluid pressure to the connection 35 and pressurization of the chamber 36 the back plate 32 moves to the right as shown in FIG. 2. This motion carries the tubular member 27 rightward thereby moving the pressure plate 22 away from the friction discs 18 and separator plates 21, and allowing free relative rotation of the input and output.

Many variations of the present invention within the spirit and scope of the appended claims will occur to those skilled in the art with reference to the above description of the preferred embodiment.

We claim:
1. A normally engaged torque transmitting device for connecting an input and output comprising:
   a. a tubular housing adapted for connection to said output including a bore, a first axially extending spline within said bore and an annular groove defined in said bore;
   b. a first snap ring carried in said groove;
   c. a friction disc carried within said bore and axially piloted on said first spline;
   d. an input member adapted for connection to said input and including a second axially extending spline thereon;
   e. a separator plate adjacent said friction disc, carried on said input member and axially piloted on said second spline;
   f. an annular pressure plate slidably received within said bore and adjacent said friction disc and separator plate;

g. release means carried within said bore to selectively urge said pressure plate away from said friction disc and separator plate, said release means comprising:
  i. an annular reaction plate slidably and sealingly carried within said bore and secured against axial movement therealong in the direction of said annular pressure plate by said first snap ring;
  ii. a tubular axially shiftable member defining an annular groove on the exterior of each end thereof, a second and third snap ring carried in respective ones of said grooves therein, said second snap ring engaging said annular pressure plate, said tubular member slidably and sealingly engaging the interior of said annular reaction plate;
  iii. a third annular plate, located within and slidably and sealingly engaging said bore and engaging the exterior said axially shiftable tubular member and said third snap ring;
  iv. said third annular plate being adjacent and spaced from said annular reaction plate and forming a cavity therebetween; and
  v. means for introducing fluid within said cavity whereby said third annular plate moves away from said reaction plate and thereby moves said pressure plate away from said discs; and
h. belville spring means between said pressure plate and said reaction plate, said spring means reacting against said pressure plate and said first snap ring to normally bias said pressure plate toward said friction disc and separator plate.

* * * * *

UNITED STATES PATENT OFFICE
CERTIFICATE OF CORRECTION

PATENT NO. : 3,893,556
DATED : July 8, 1975
INVENTOR(S) : Ted Lech, Jr., and Christian M. Waldhelm It is certified that error appears in the above-identified patent and that said Letters Patent are hereby corrected as shown below:

On the cover sheet number [73] Assignee: Listed as "Dana Corporation" and should be -- Formsprag Company -- as shown in Recorded Assignment on Reel 3079, Frame 101 and 102 recorded May 2, 1974.

Signed and Sealed this second Day of December 1975

[SEAL]

Attest:

RUTH C. MASON
Attesting Officer

C. MARSHALL DANN
Commissioner of Patents and Trademarks